US 8,553,744 B2

Oct. 8, 2013

(12) United States Patent
Jia et al.

(10) Patent No.: US 8,553,744 B2
(45) Date of Patent: Oct. 8, 2013

(54) PULSE ARBITRATION FOR NETWORK COMMUNICATIONS

(75) Inventors: Zhanfeng Jia, Belmont, CA (US); David Jonathan Julian, San Diego, CA (US); Amal Ekbal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 12/349,430

(22) Filed: Jan. 6, 2009

(65) Prior Publication Data

US 2010/0172393 A1 Jul. 8, 2010

(51) Int. Cl.
*H04B 1/00* (2006.01)

(52) U.S. Cl.
USPC .......................................... 375/132; 375/130

(58) Field of Classification Search
USPC ........................................................ 375/132
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |
| 6,304,623 B1 | 10/2001 | Richards et al. | |
| 6,351,652 B1 | 2/2002 | Finn et al. | |
| 6,354,946 B1 | 3/2002 | Finn | |
| 6,400,307 B2 | 6/2002 | Fullerton et al. | |
| 6,400,329 B1 | 6/2002 | Barnes | |
| 6,421,389 B1 | 7/2002 | Jett et al. | |

(Continued)

FOREIGN PATENT DOCUMENTS

| | | |
|---|---|---|
| JP | 6343066 A | 12/1994 |
| JP | 2003506979 | 2/2003 |

(Continued)

OTHER PUBLICATIONS

International Search Report & Written Opinion—PCT/US2010/020085, International Search Authority—European Patent Office—May 18, 2010.

(Continued)

*Primary Examiner* — Erin File
(74) *Attorney, Agent, or Firm* — Paul S. Holdaway

(57) ABSTRACT

An apparatus for communications configured to support first and second spread-spectrum channels, each of the first and second channels being based on a different pseudorandom sequence. The apparatus further configured to select one of the first and second channels for communications to avoid a collision of information that would otherwise occur based on their pseudorandom sequences.

40 Claims, 5 Drawing Sheets

(56) References Cited

U.S. PATENT DOCUMENTS

| | | |
|---|---|---|
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,292,617 B2 | 11/2007 | Beasley et al. |
| 2003/0072252 A1* | 4/2003 | Gurney et al. ............... 370/206 |
| 2003/0164794 A1 | 9/2003 | Haynes et al. |
| 2003/0185166 A1* | 10/2003 | Belcea ......................... 370/321 |
| 2004/0141547 A1 | 7/2004 | Paquelet |
| 2007/0245008 A1 | 10/2007 | Matsui et al. |
| 2007/0254593 A1 | 11/2007 | Jollota et al. |
| 2008/0013638 A1 | 1/2008 | Walton et al. |
| 2008/0014970 A1 | 1/2008 | Wong et al. |
| 2008/0117939 A1* | 5/2008 | Ekbal et al. .................. 370/517 |
| 2008/0219285 A1* | 9/2008 | Key et al. ..................... 370/445 |
| 2009/0003484 A1* | 1/2009 | Li et al. ........................ 375/271 |
| 2009/0257396 A1* | 10/2009 | Eliezer et al. ................ 370/330 |

FOREIGN PATENT DOCUMENTS

| | | |
|---|---|---|
| JP | 2004015505 A | 1/2004 |
| JP | 2004135350 A | 4/2004 |
| JP | 2007288378 A | 11/2007 |
| JP | 2008535366 A | 8/2008 |
| WO | 0111897 A2 | 2/2001 |
| WO | 0205468 A1 | 1/2002 |
| WO | WO2007137251 | 11/2007 |
| WO | 2008061251 | 5/2008 |

OTHER PUBLICATIONS

Taiwan Search Report—TW098146483—TIPO—Sep. 4, 2012.

Jung, C.Y., et.al., "Orthogonal Time Hopping Multiple Access for UWB Impulse Radio Communications", 2005 Asia-Pacific Conference on Communications, IEEE, Oct. 2005, pp. 353-357.

* cited by examiner

PULSE ARBITRATION FOR NETWORK COMMUNICATIONS

BACKGROUND

1. Field

The present disclosure relates generally to wireless communications, and more specifically, to various techniques to reduce the probability that the information communicated over multiple wireless connections supported by a wireless node will not collide.

2. Background

Peer-to-peer networks are commonly used for connecting wireless nodes. These networks differ from the traditional client-server model where communications are usually with a central server. A peer-to-peer network has only equal peer nodes that communicate directly with one another. Such networks are useful for many purposes. A peer-to-peer network may be used, for example, as a consumer electronic wire replacement system for short range or indoor applications. These networks are often referred to as Wireless Personal Area Networks (WPAN)s and are useful for efficiently transferring video, audio, voice, text, and other media between wireless nodes in a network.

Ultra-wideband (UWB) radio technology is often used to support short range communications in dense multipath environments as the case may be in a WPAN. UWB is a technology for providing high speed communications over an extremely wide bandwidth. Because UWB signals are transmitted in very short pulses that consume very little power, this technology is well suited for wireless nodes capable of supporting multiple links. A wireless node configured in this way, however, may experience a situation where information communicated over multiple links collide. Accordingly, there is a need in the art to reduce the probability of collisions in a wireless node capable of supporting multiple links.

SUMMARY

In one aspect of the disclosure, an apparatus for communications includes a processing system configured to support first and second spread-spectrum channels, each of the first and second channels being based on a different pseudorandom sequence, wherein the processing system is further configured to select one of the first and second channels for communications to avoid a collision of information that would otherwise occur based on their pseudorandom sequences.

In another aspect of the disclosure, a method for communications includes supporting first and second spread-spectrum channels, each of the first and second channels being based on a different pseudorandom sequence, and selecting one of the first and second channels for communications to avoid a collision of information that would otherwise occur based on their pseudorandom sequences.

In yet another aspect of the disclosure, an apparatus for communications includes means for supporting first and second spread-spectrum channels, each of the first and second channels being based on a different pseudorandom sequence, and means for selecting one of the first and second channels for communications to avoid a collision of information that would otherwise occur based on their pseudorandom sequences.

In a further aspect of the disclosure, computer-program product for wireless communications includes computer-readable medium comprising codes executable by at least one processor to support first and second spread-spectrum channels, each of the first and second channels being based on a different pseudorandom sequence, and select one of the first and second channels for communications to avoid a collision of information that would otherwise occur based on their pseudorandom sequences.

In yet a further aspect of the disclosure, a headset includes a processing system configured to support first and second spread-spectrum channels, each of the first and second channels being based on a different pseudorandom sequence, wherein the processing system is further configured to select one of the first and second channels for communications to avoid a collision of information that would otherwise occur based on their pseudorandom sequences, and a transducer configured to provide an audio output based on information from at least one of the first and second channels.

In another aspect of the disclosure, a watch includes a processing system configured to support first and second spread-spectrum channels, each of the first and second channels being based on a different pseudorandom sequence, wherein the processing system is further configured to select one of the first and second channels for communications to avoid a collision of information that would otherwise occur based on their pseudorandom sequences, and a user interface configured to provide an indication based on information from at least one of the first and second channels.

In yet another aspect of the disclosure, a sensing device for wireless communications includes a processing system configured to support first and second spread-spectrum channels, each of the first and second channels being based on a different pseudorandom sequence, wherein the processing system is further configured to select one of the first and second channels for communications to avoid a collision of information that would otherwise occur based on their pseudorandom sequences, and a sensor configured to provide information to at least one the first and second channels.

It is understood that other aspects of the disclosure will become readily apparent to those skilled in the art from the following detailed description, wherein various aspects of heterogeneous wireless ad-hoc networks are shown and described by way of illustration. As will be realized, these aspects of the disclosure may be implemented in other and different configurations and its several details are capable of modification in various other respects. Accordingly, the drawings and detailed description are to be regarded as illustrative in nature and not as restrictive.

Figure 1:
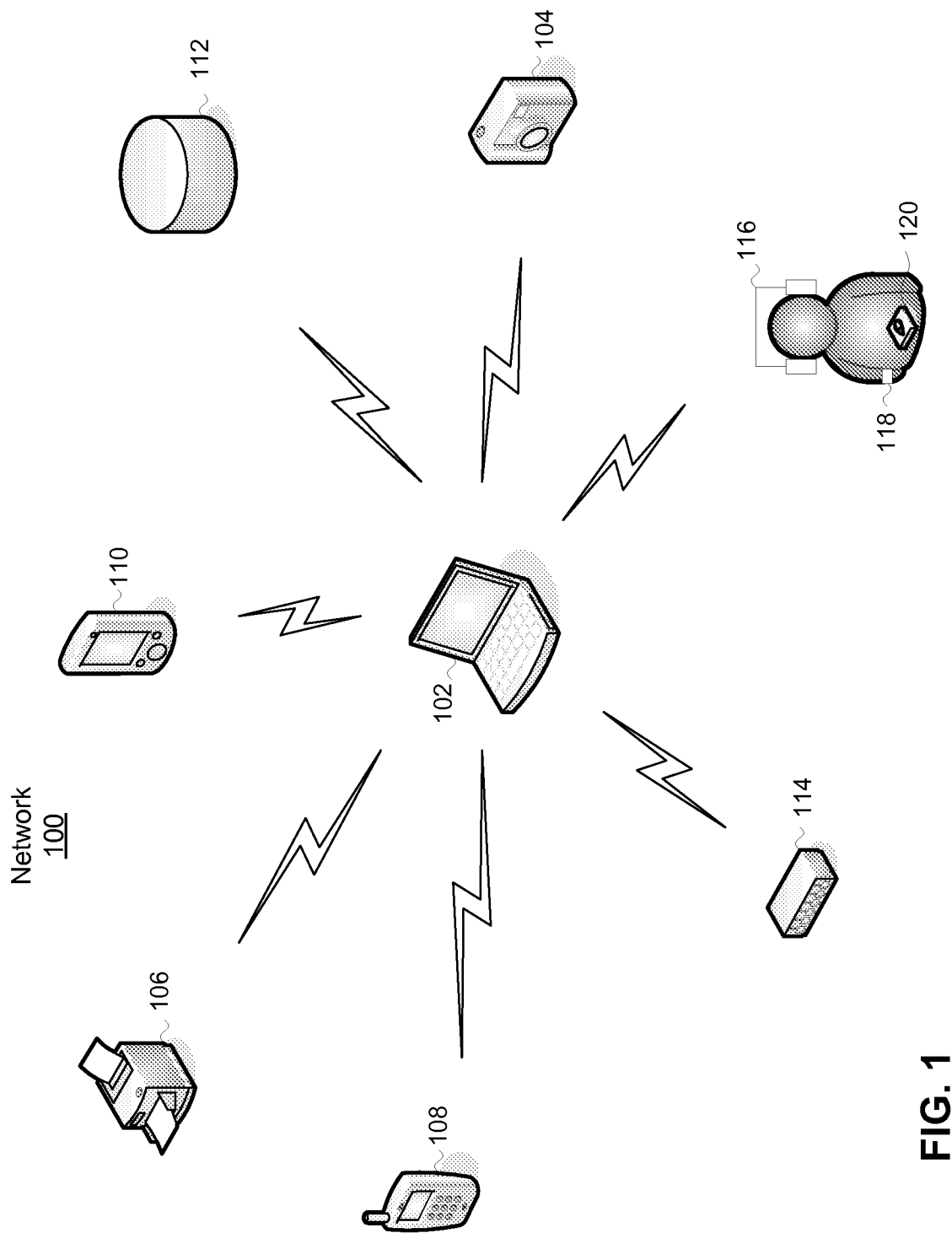
FIG. 1 is a conceptual diagram illustrating an example of a wireless network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein, one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a network will now be presented with reference to FIG. 1. The network 100 may be a peer-to-peer network formed by a number or wireless nodes or any other network where information communicated over multiple links by a wireless node may collide. The network 100 is shown as a WPAN with a laptop computer 102 in communication with various other nodes, but may be implemented as a Wireless Local Area Network (WLAN) covering a small geographic area, like a home, office, or building, or even a Wireless Wide Area Network (WWAN) covering a relatively broad geographic region (i.e., a regional, nationwide, or global region). In this example, the computer 102 may receive digital photos from a digital camera 104, send documents to a printer 106 for printing, synch-up with e-mail on a personal digital assistant (PDA) 108, transfer music files to a digital audio player (e.g., MP3 player) 110, back up data and files to a mobile storage device 112, and communicate with a remote network (e.g., the Internet) via a wireless hub 114. The network 100 may also include a number of mobile and compact nodes, either wearable or implanted into the human body. By way of example, a person may be wearing a headset 116 (e.g., headphones, earpiece, etc.) that receives streamed audio from the computer 102, a watch 118 that is set by the computer 102, and/or a sensor 120 which monitors vital body parameters (e.g., a biometric sensor, a heart rate monitor, a pedometer, and EKG device, etc.). The sensor 120 transmits information from the body of the person to the computer 102 where the information may be forwarded to a medical facility (e.g., hospital, clinic, etc.) via the wireless hub 114.

The network may be implemented with various radio technologies to support the wireless links between the nodes. Impulse radio, a form of UWB, is a radio technology that is well suited for short range communications in dense multipath environments as the case may be in the WPAN network shown in FIG. 1. Impulse radio communicates with a low duty cycle pulse train with each pulse having a very short duration, thus resulting in an ultra-wideband signal. Networks implementing this technology must often contend with interfering signals and should be designed to avoid interfering with narrowband systems operating in dedicated bands. This necessitates the use of spread spectrum techniques. Examples of spread spectrum techniques include direct sequence, frequency hopping, and time hopping. A common technique for spreading the spectrum is time hopping with pulse position modulation.

Figure 2:
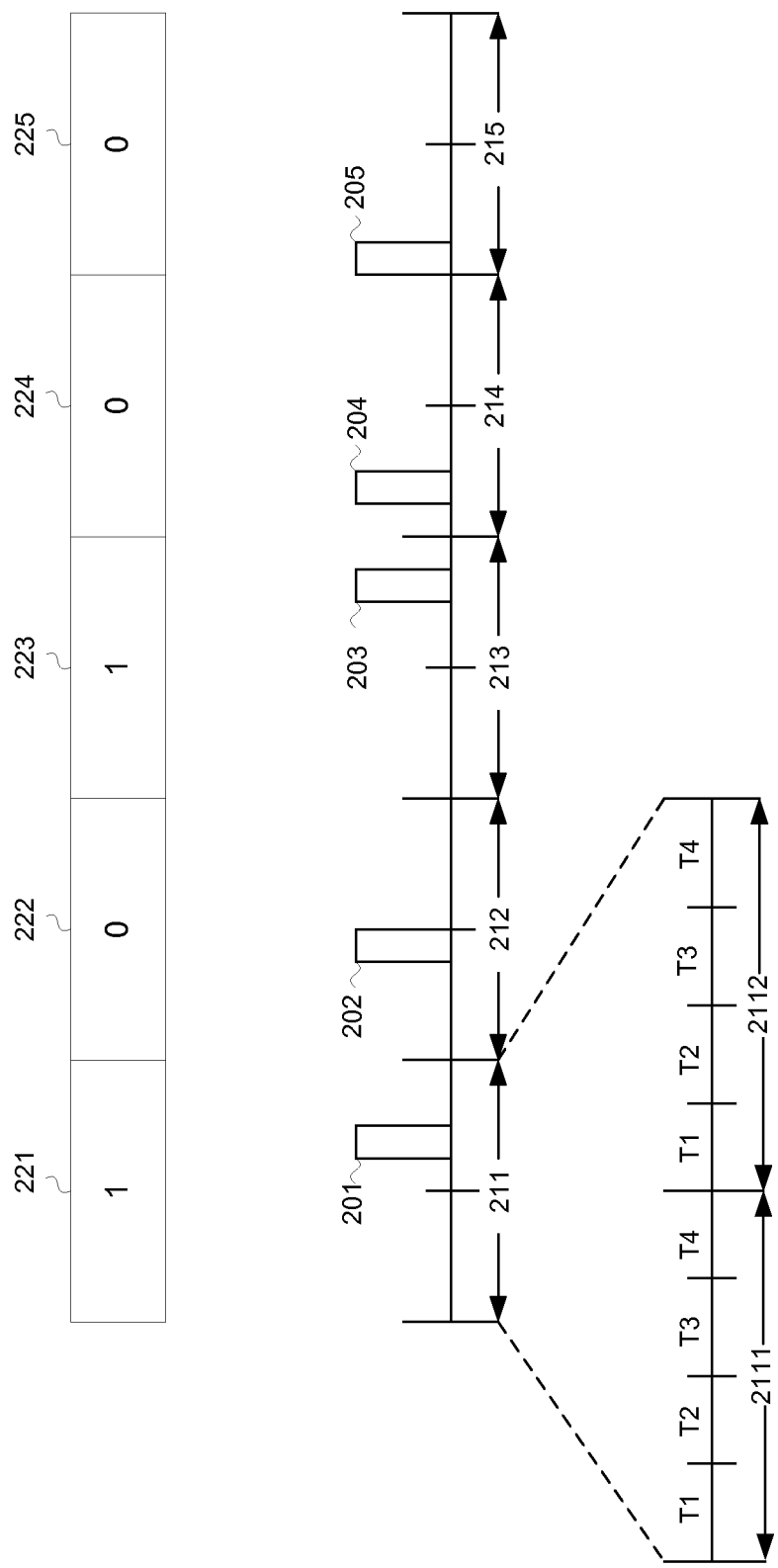
FIG. 2 is a timing diagram illustrating an example of BPPM spread spectrum impulse radio UWB communications.

Various aspects of a wireless node will now be presented with reference to a network using time hopping to spread the spectrum of an impulse radio UWB system with Binary Pulse Position Modulation (BPPM), although these aspects may be applied to other radio technologies and modulation schemes. FIG. 2 is a timing diagram illustrating a BPPM spread spectrum impulse radio UWB system. In this example, a symbol is transmitted in every frame. One or more "symbols" are generally used to represent a data bit in a communications system employing forward error correction and/or constellation mapping, but the term "symbol" should be construed broadly to also include a data bit or any other data unit. The frame is divided into first and second halves with each half being further divided into multiple time slots. A pulse is transmitted in one time slot in the first half of the frame if the symbol is "zero" and transmitted in one time slot in the second half of the frame if the symbol is "one." Referring to FIG. 2, a first pulse 201 is transmitted in the second half of the first frame 211 to represent a "one" symbol 221, a second pulse 202 is transmitted in the first half of the second frame 212 to represent a "zero" symbol 222, a third pulse 203 is transmitted in the second half of the third frame 213 to represent a "one" symbol 223, a fourth pulse 204 is transmitted in the first half of the fourth frame 214 to represent a "zero" symbol 224, and a fifth pulse 205 is transmitted in the first half of the fifth frame 215 to represent a "zero" symbol 225.

The time slots occupied by the pulses within the half frames are changed or randomized by a pseudorandom sequence. As shown in FIG. 2 in the enlarged portion of the first frame 211, each half frame is divided into multiple time slots. In this example, there are four time slots (T1-T4) in the first half frame 2111 and four time slots (T1-T4) in the second half of the frame 2112. Based on the pseudorandom sequence the pulse 201 is assigned to the second time slot T2. Since the symbol is "one" 221, the pulse 201 is transmitted in the second time slot T2 of the second half of the frame 2112. Had the symbol been "zero," the pulse 201 would have been transmitted in the second time slot T2 of the first half of the frame 2111.

Figure 3:
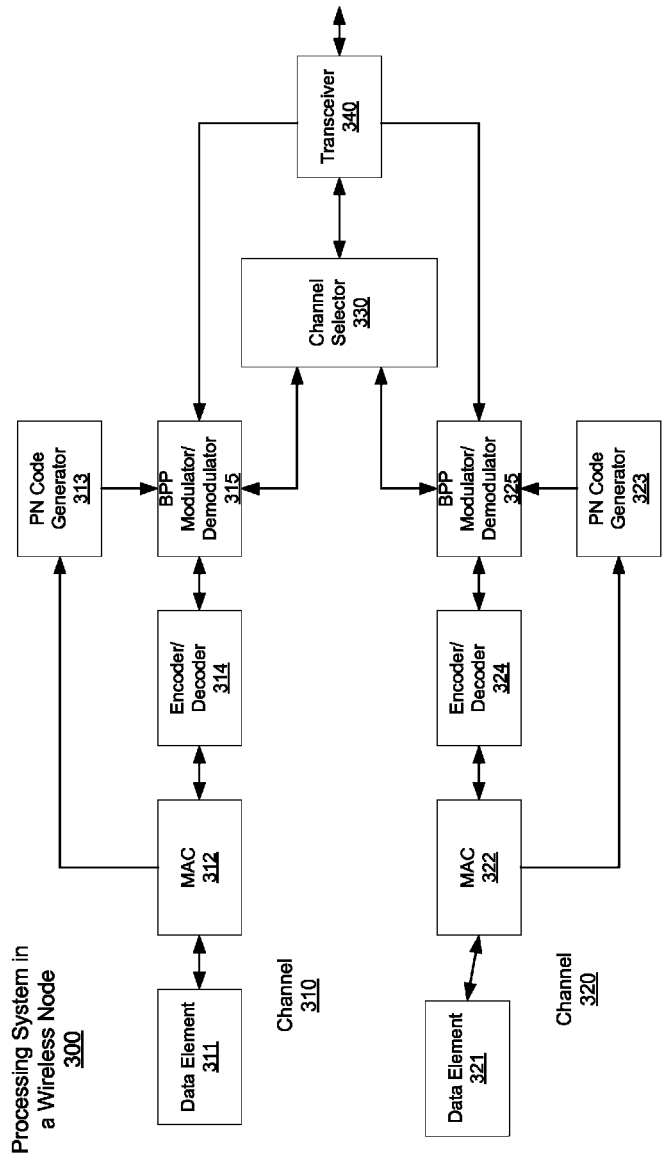
FIG. 3 is a conceptual diagram illustrating an example of a processing system in a wireless node.

FIG. 3 is a conceptual block diagram illustrating an example of a processing system in a wireless node. The processing system 300 is shown supporting two spread spectrum channels 310, 320, but may support any number of channels depending on the particular application.

Each channel 310, 320 includes a data element 311, 321, which provides a data source for a transmitting node and/or a data sink for a receiving node. The term "receiving node" refers to a wireless node that is receiving information from another node and the term "transmitting node" refers to a wireless node that is transmitting information to another node. Such a reference does not imply that the wireless node is incapable of performing both transmit and receive functions. Each data element 311, 321 may be an application running on the wireless node, or some other suitable data unit capable of sourcing and/or sinking data. By way of example, the wireless node may be a laptop computer 102 (see FIG. 1) running an application on the first channel 310 to synch-up with e-mail on a PDA, and running another application on the second channel 320 to transfer music files to a digital audio player (e.g., MP3 player).

Each channel also includes a Media Access Controller (MAC) 312, 322 that interfaces to its respective data element 311, 321. Each MAC 312, 322 provides channel access control mechanisms that make it possible for several channels to be supported over the same physical medium. In this example, each MAC 312, 322 provides a seed to a pseudorandom noise (PN) code generator 313, 323, respectively. Each PN code generator 313, 323 generates a pseudorandom sequence from the seed, which is used to spread the spectrum of its respective channel 310, 320.

Each channel also includes an encoder/decoder 314, 324 configured to provide various signal processing functions at the physical layer. By way of example, the encoder/decoder 314, 324 on each channel may be used to provide forward error correction and signal constellation mapping functions. These signal processing functions are well known in the art and generally provided in wireless nodes for multi-access applications or other situations where information transmitted over a medium may be corrupted.

Each channel 310, 320 also includes a binary pulse position (BPP) modulator/demodulator 315, 325, respectively. In the transmit mode, each modulator 315, 325 receives a symbol stream from its respective encoder/decoder 314, 324. Each modulator 315, 325 generates a frame for each symbol period and then determines for each frame whether a pulse should be transmitted in the first or second half of the frame based on the polarity of the symbol. Each modulator 315, 325 also determines the time slot within the half frame for transmitting the pulse based on the pseudorandom sequence from its respective pseudorandom code generator 313, 323.

As will be described in greater detail later, a channel selector 330 is configured to select one or both of the channels to maximize throughput while at the same time avoiding collisions of information carried by both channels. When selected, the modulator(s) 315, 325 supporting the selected channel(s) provide the pulse position information to a transceiver 340. Based on this information, the transceiver 340 generates a series of pulses for transmission over the wireless medium.

In the receive mode, the demodulators 315, 325 receive pulse position information for the selected channels from the transceiver 340. The seed used to generate the pseudorandom sequence used to spread the channel from the transmitting node is known, a priori, by the receiving node through an exchange of signaling messages when the channel is initially established. More specifically, when a channel is established between a transmitting and receiving node, the transmitting node sends the seed to the receiving node. The seed is received by the transceiver 340 and provided to the PN code generator connected with the channel being established. The seed is used by the PN code generator to synch up with the PN generator in the transmitting node. Once synched, the PN code generators 313, 323 for the selected channels provide time slot information to their respective demodulators 315, 325 for each frame. The demodulators 315, 325 for the selected channels can then search for a pulse in the appropriate time slot for each half frame. If the demodulator for a selected channel detects a pulse in the appropriate time slot during the first half of the frame, it provides a "zero" symbol to its respective data unit. Conversely, if the demodulator for a selected channel detects a pulse in the appropriate time slot during the second half of the frame, it provides a "one" symbol to its respective data unit.

Figure 4:
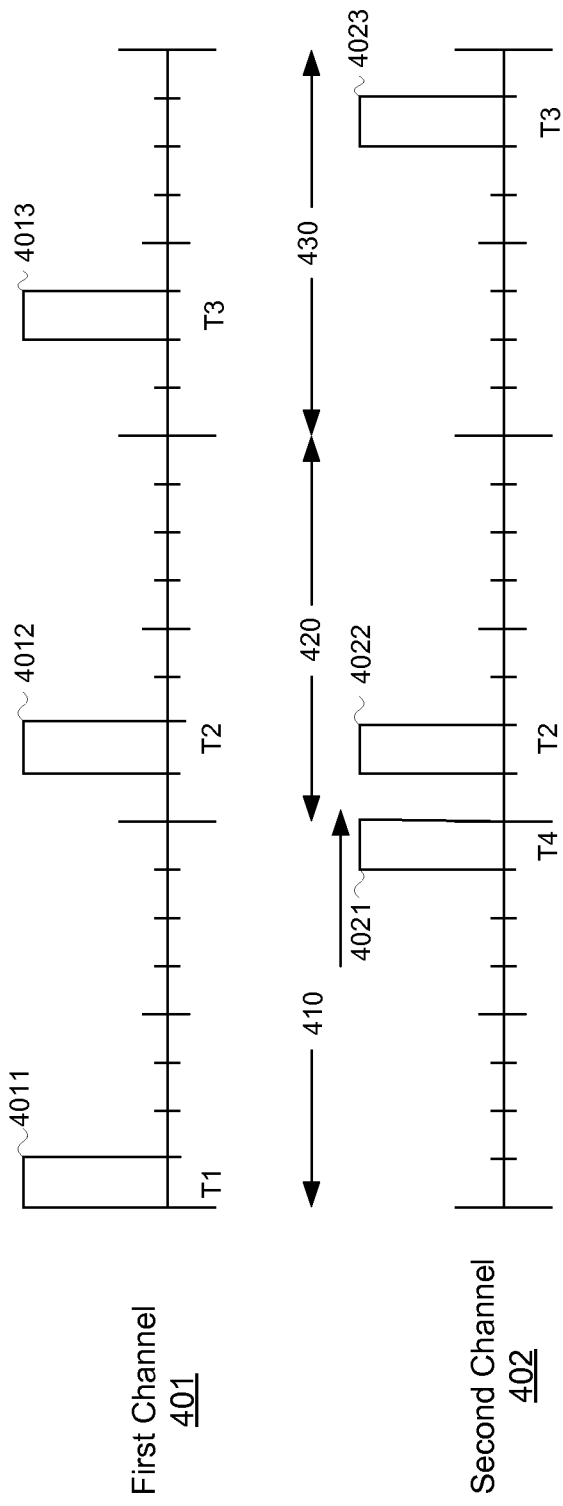
FIG. 4 is a timing diagram illustrating an example of two spread spectrum channels between a transmitting node and a receiving node.

As mentioned earlier, the channel selector 330 is configured to select one or both of the channels to maximize throughput while at the same time avoiding collisions of information carried by both channels. A "collision" occurs when a receiving node is unable to decode information on multiple channels during a frame due to the position of the pulses within that frame. An example of this concept will now be presented with reference to FIG. 4. FIG. 4 is a timing diagram illustrating two spread spectrum channels between a transmitting node and a receiving node. In this example, a transmitting node uses the first and second channels 401, 402 to send a series of pulses to a receiving node. The first channel 401 has a first pulse 4011 occupying the first time slot T1 in the first half of the first frame 410, a second pulse 4012 occupying the second time slot T2 in the first half of the second frame 420, and a third pulse 4013 occupying the third time slot T3 in the first half of the third frame 430, representing a symbol stream of 000. The second channel 402 has a first pulse 4021 occupying the fourth time slot T4 in the second half of the first frame 410, a second pulse 4022 occupying the second time slot T2 in the first half of the second frame 420, and a third pulse 4023 occupying the third time slot T3 in the second half of the third frame 430, representing a symbol stream of 101. As will be explained in greater detail below, the receiving node will be unable to decode the pulses 4013, 4023 sent by the transmitting node during the third frame 430.

Referring to FIGS. 3 and 4 in connection with the receiving node, the demodulator 315 for the first channel 310 listens for a pulse during the first time slot T1 for each of the first and second halves of the first frame 410, and the demodulator 325 for the second channel 320 listens for a pulse during the fourth time slot T4 for both the first and second halves of the frame 410. Consequently, the information on the first and second channels 310, 320 will not collide during the first frame 410.

During the second frame 420, the demodulators 315, 325 for both channels 310, 320 listen for a pulse during the second time slot T2 for both the first and second halves of the frame 420. However, in this case, the information does not collide. Both demodulators 315, 325 detect the combined energy of the pulses during the second time slot T2 for the first half of the second frame 420 and detect nothing during the second time slot T2 for the second half of the second frame 420, and as a result, can determine that the symbol is "zero."

Turning to the third frame 430, the demodulators 315, 325 for both channels 310, 320 listen for a pulse during the third time slot T3 for both the first and second halves of the frame 430. Here, the demodulators 315, 325 detect a pulse in both the first and second halves of the frame 430, and therefore, cannot determine whether the symbol is "one" or "zero."

The channel selector 330 at the transmitting node may be configured to determine whether a collision will occur for each frame prior to transmission. In the example presented above, the channel selector 330 determines that a collision will occur in the third frame 430 from information it receives from the modulators 315, 325. Based on this determination, the channel selector 330 in the transmitting node will select one of the two channels to transmit on. By way of example, the channel selector 330 may chose to use the first channel 401 to transmit the pulse 4013 to the receiving node during the third frame 430 and either discard the pulse 4023 scheduled for transmission on the second channel 402 or transmit it during a subsequent frame. Alternatively, the channel selector 330 may chose to use the second channel 402 to transmit the pulse 4023 to the receiving node during the third frame 430, while either discarding the pulse 4013 scheduled for transmission on the first channel 401 or transmitting it during a subsequent frame.

The channel selection feature may also be employed by a wireless node that transmits a pulse on one channel and receives a pulse on another channel during the same frame. Referring to FIGS. 3 and 4, the wireless node may be scheduled to transmit a series of pulses on the first channel 401 and receive a series of pulses on the second channel 402. Under these conditions, the demodulator 325 would listen for a pulse during the third time slot T3 for both the first and second halves of the third frame 430. The demodulator 325 would detect a pulse 4013 in the third time slot T3 of the first half of the third frame 430 due to transmission leakage through the transceiver 340 and also detect a pulse 4023 from another wireless node in the third time slot T3 of the second half of the third frame 430. As a result, the demodulator 325 would be unable to determine whether the symbol received from the other wireless node was a "one" or "zero." To avoid this collision situation, the channel selector 330 may be configured to select either the first channel 401 to transmit a pulse or the second channel 402 to receive a pulse during the third frame 430.

The selection criterion used by the channel selector 330 to avoid collisions may vary depending upon any number of factors including, but not limited to, the particular application and the overall design constraints imposed on the overall system. By way of example, if the wireless node is scheduled to transmit on the first channel 310 during a frame and receive on the second channel 320 during the same frame, the channel selector 330 may decide to select the first channel 310 to avoid a collision of information on both channels.

The channel selector 330 may use other selection criterion to avoid a collision in the case where the wireless node is scheduled to transmit on both channels 310, 320. By way of example, the channel selector 330 may select the channel with the highest quality of service (QoS) requirements or highest priority. In the case where voice is being transmitted on one channel and data is being transmitted on the other channel, the channel selector 330 may choose the channel carrying voice when a collision would otherwise occur due to the pseudorandom sequences for the channels. When a channel is being used to send an acknowledgement back to a transmitting node, that channel may be selected by the channel selector 330. In one configuration of a wireless node, the channel selector 330 may be configured to select a channel based on a fairness criterion. The fairness criterion may be implemented by an algorithm that considers previous decisions by the channel selector 330 in an attempt to provide each channel with equal access to the medium.

The processing system 300 may be implemented as electronic hardware, computer software, or combinations of both. To illustrate this interchangeability of hardware and software, the processing system 300 has been described above generally in terms of their functionality. Whether such functionality is implemented as hardware or software depends upon the particular application and design constraints imposed on the overall system. Skilled artisans may implement the described functionality in varying ways for each particular application.

By way of example, and without limitation, the processing system 300 may be implemented with one or more processors. A processor may be a general-purpose or special-purpose processor. Examples include a microprocessor, a microcontroller, a Digital Signal Processors (DSP), an Application Specific Integrated Circuit (ASIC), a Field Programmable Gate Array (FPGA), a Programmable Logic Device (PLD), a controller, a state machine, gated logic, discrete hardware components, or any other processing circuit that can perform the various functionalities described throughout this disclosure.

A processor may be configured to execute software. Examples of processors capable of executing software include a microprocessor capable of accessing software on machine-readable media, all linked together with other supporting circuitry through an external bus architecture, an ASIC with embedded software and supporting circuitry integrated into a single chip, or some other software based processor architecture.

Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The machine-readable media may be part of the processing system 305. Alternatively, any portion of the machine-readable media may be external to the processing system 300. By way of example, the machine-readable media may include a transmission line, a carrier wave modulated by data, and/or a computer product separate from the processing system 300 or the wireless node, all which may be accessed by the processor system 300 through the transceiver 340 or by other means.

The software supported by the machine-readable media may reside in a single storage device or distributed across multiple memory devices. By way of example, software may be loaded into RAM from a hard drive. During execution of the software, the processor may load some of the instructions into cache to increase access speed. One or more cache lines may then be loaded into a general register file for execution by the processor. When referring to the functionality of a software, it will be understood that such functionality is implemented by the processor when executing software instructions.

Figure 5:
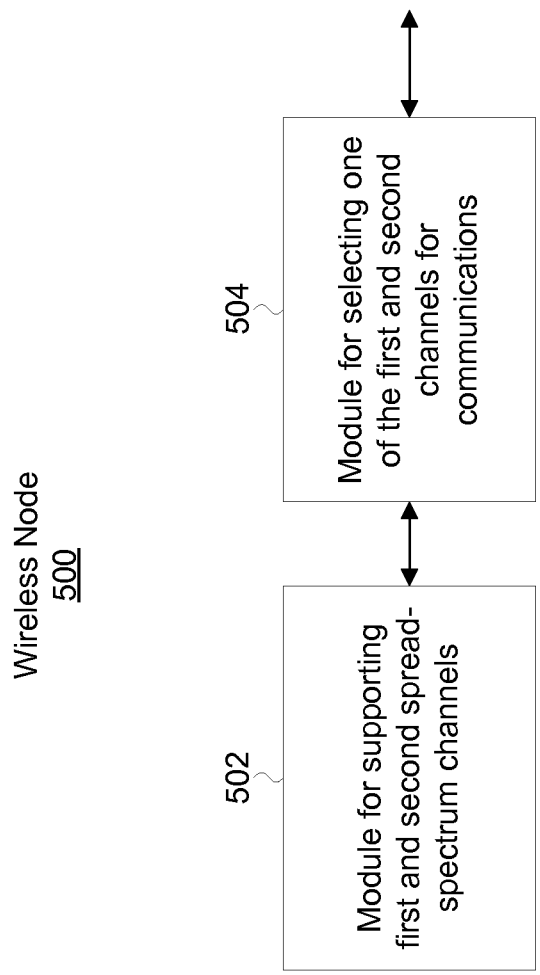
FIG. 5 is a conceptual diagram illustrating an example of the functionality of a wireless node.

FIG. 5 is a conceptual diagram illustrating an example of the functionality of a wireless node. In this example, the wireless node 500 includes a module 502 for supporting first and second spread-spectrum channels, each of the first and second channels being based on a different pseudorandom sequence. The wireless node 500 also includes a module 504 for selecting one of the first and second channels for communications to avoid a collision of information that would otherwise occur based on their pseudorandom sequences.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communications, comprising:
a processing system configured to:
support first and second spread-spectrum channels, each of the first and second channels being based on a different pseudorandom sequence;
determine whether a collision of information on the first and second channels would occur based on the pseudorandom sequences; and
select, based on the collision determination, between using one of the first and second channels for communications or using both of the first and second channels for communications.

2. The apparatus of claim 1 wherein the processing system is further configured to use frequency hopping to spread the spectrum of the first and second channels, wherein the frequency hopping for each of the first and second channels is based on its a respective one of the pseudorandom sequences.

3. The apparatus of claim 1 wherein the processing system is further configured to use time hopping to spread the spectrum of the first and second channels, wherein the time hopping for each of the first and second channels is based on its a respective one of the pseudorandom sequences.

4. The apparatus of claim 3 wherein the processing system is further configured to use time hopping with binary pulse position modulation to spread the spectrum of the first and second channels.

5. The apparatus of claim 1 wherein the processing system is further configured to select the first channel if the first channel is scheduled to transmit and the second channel is scheduled to receive when the information on the first and second channels would otherwise collide.

6. The apparatus of claim 1 wherein the processing system is further configured to select the first channel if the first channel has a higher quality of service requirement than the second channel.

7. The apparatus of claim 1 wherein the processing system is further configured to select the first channel if the first channel contains voice and the second channel contains data when the information on the first and second channels would otherwise collide.

8. The apparatus of claim 1 wherein the processing system is further configured to select the first channel if the first channel contains an acknowledgement of a transmission and the second channel does not contain an acknowledgement of a transmission.

9. The apparatus of claim 1 wherein the processing system is further configured to select one of the first and second channels based on at least one fairness criterion.

10. The apparatus of claim 1 wherein the processing system is further configured to select the first channel if the first channel has a higher priority than the second channel.

11. The apparatus of claim 1 wherein the processing system is further configured to randomly select one of the first and second channels based on a determination that a collision of information would occur.

12. The apparatus of claim 1 wherein the processing system is further configured to:
use time hopping with pulse position modulation to spread the spectrum of the first and second channels; and
determine whether the collision would occur by determining whether pulses are scheduled on the first and second channels in a common time slot number in different portions of a symbol frame, wherein the different portions of the symbol frame correspond to different values for the pulse position modulation.

13. A method for communications for an apparatus, comprising:
supporting first and second spread-spectrum channels, each of the first and second channels being based on a different pseudorandom sequence;
determining whether a collision of information on the first and second channels would occur based on the pseudorandom sequences; and
selecting, based on the collision determination, between using one of the first and second channels for communications or using both of the first and second channels for communications.

14. The method of claim 13 further comprising using frequency hopping to spread the spectrum of the first and second channels, wherein the frequency hopping for each of the first and second channels is based on its a respective one of the pseudorandom sequences.

15. The method of claim 13 further comprising using time hopping to spread the spectrum of the first and second channels, wherein the time hopping for each of the first and second channels is based on its a respective one of the pseudorandom sequences.

16. The method of claim 15 wherein time hopping is used with binary pulse position modulation to spread the spectrum of the first and second channels.

17. The method of claim 13 wherein the first channel is selected if the first channel is scheduled to transmit and the second channel is scheduled to receive when the information on the first and second channels would otherwise collide.

18. The method of claim 13 wherein the first channel is selected if the first channel has a higher quality of service requirement than the second channel.

19. The method of claim 13 wherein the first channel is selected if the first channel contains voice and the second channel contains data when the information on the first and second channels would otherwise collide.

20. The method of claim 13 wherein the first channel is selected if the first channel contains an acknowledgement of a transmission and the second channel does not contain an acknowledgement of a transmission.

21. The method of claim 13 wherein one of the first and second channels is selected based on at least one fairness criterion.

22. The method of claim 13 wherein the first channel is selected if the first channel has a higher priority than the second channel.

23. The method of claim 13 further comprising randomly selecting one of the first and second channels based on a determination that a collision of information would occur.

24. The method of claim 13 further comprising:
using time hopping with pulse position modulation to spread the spectrum of the first and second channels; and
determining whether the collision would occur by determining whether pulses are scheduled on the first and second channels in a common time slot number in different portions of a symbol frame, wherein the different portions of the symbol frame correspond to different values for the pulse position modulation.

25. An apparatus for communications, comprising:
means for supporting first and second spread-spectrum channels, each of the first and second channels being based on a different pseudorandom sequence;

means for determining whether a collision of information on the first and second channels would occur based on the pseudorandom sequences; and means for selecting, based on the collision determination, between using one of the first and second channels for communications or using both of the first and second channels for communications.

26. The apparatus of claim 25 wherein the means for supporting first and second spread-spectrum channels is configured to use frequency hopping to spread the spectrum of the first and second channels, wherein the frequency hopping for each of the first and second channels is based on its a respective one of the pseudorandom sequences.

27. The apparatus of claim 25 wherein the means for supporting first and second spread-spectrum channels is configured to use time hopping to spread the spectrum of the first and second channels, wherein the time hopping for each of the first and second channels is based on a respective one of the pseudorandom sequences.

28. The apparatus of claim 27 wherein the means for supporting first and second spread-spectrum channels is further configured to use time hopping with binary pulse position modulation to spread the spectrum of the first and second channels.

29. The apparatus of claim 25 wherein the means for selecting one of the first and second channels is configured to select the first channel if the first channel is scheduled to transmit and the second channel is scheduled to receive when the information on the first and second channels would otherwise collide.

30. The apparatus of claim 25 wherein the means for selecting one of the first and second channels is configured to select the first channel if the first channel has a higher quality of service requirement than the second channel.

31. The apparatus of claim 25 wherein the means for selecting one of the first and second channels is configured to select the first channel if the first channel contains voice and the second channel contains data when the information on the first and second channels would otherwise collide.

32. The apparatus of claim 25 wherein the means for selecting one of the first and second channels is configured to select the first channel if the first channel contains an acknowledgement of a transmission and the second channel does not contain an acknowledgement of a transmission.

33. The apparatus of claim 25 wherein the means for selecting one of the first and second channels is configured to select sftone of the first and second channels based on at least one fairness criterion.

34. The apparatus of claim 25 wherein the means for selecting one of the first and second channels is configured to select the first channel if the first channel has a higher priority than the second channel.

35. The apparatus of claim 25 wherein means for selecting one of the first and second channels is configured to randomly select one of the first and second channels based on a determination that a collision of information would occur.

36. A computer-program product for wireless communications, comprising:

non-transitory computer-readable medium comprising codes executable by at least one processor to:

support first and second spread-spectrum channels, each of the first and second channels being based on a different pseudorandom sequence;

determine whether a collision of information on the first and second channels would occur based on the pseudorandom sequences; and select, based on the collision determination, between using one of the first and second channels for communications or using both of the first and second channels for communications.

37. A headset, comprising:

a processing system configured to:

support first and second spread-spectrum channels, each of the first and second channels being based on a different pseudorandom sequence, determine whether a collision of information on the first and second channels would occur based on the pseudorandom sequences, and select, based on the collision determination, between using one of the first and second channels for communications or using both of the first and second channels for communications; and a transducer configured to provide an audio output based on information from at least one of the first and second channels.

38. A watch comprising:

a processing system configured to:

support first and second spread-spectrum channels, each of the first and second channels being based on a different pseudorandom sequence, determine whether a collision of information on the first and second channels would occur based on the pseudorandom sequences, and select, based on the collision determination, between using one of the first and second channels for communications or using both of the first and second channels for communications; and a user interface configured to provide an indication based on information from at least one of the first and second channels.

39. A sensing device for wireless communications, comprising:

a processing system configured to:

support first and second spread-spectrum channels, each of the first and second channels being based on a different pseudorandom sequence, determine whether a collision of information on the first and second channels would occur based on the pseudorandom sequences, and select, based on the collision determination, between using one of the first and second channels for communications or using both of the first and second channels for communications; and a sensor configured to provide information to at least one of the first and second channels.

40. The apparatus of claim 25 wherein:

the means for supporting first and second spread-spectrum channels is configured to use time hopping with pulse position modulation to spread the spectrum of the first and second channels; and the means for determining whether a collision of information on the first and second channels would occur is configured to determine whether pulses are scheduled on the first and second channels in a common time slot number in different portions of a symbol frame, wherein the different portions of the symbol frame correspond to different values for the pulse position modulation.

* * * * *